(12) United States Patent
Kang et al.

(10) Patent No.: US 9,058,253 B2
(45) Date of Patent: Jun. 16, 2015

(54) DATA TREE STORAGE METHODS, SYSTEMS AND COMPUTER PROGRAM PRODUCTS USING PAGE STRUCTURE OF FLASH MEMORY

(75) Inventors: Dong-Won Kang, Seoul (KR); Jeong-Uk Kang, Gyeonggi-do (KR); Jin-Soo Kim, Daejeon (KR); Chan-Ik Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 863 days.

(21) Appl. No.: 12/167,324

(22) Filed: Jul. 3, 2008

(65) Prior Publication Data

US 2009/0012976 A1 Jan. 8, 2009

(30) Foreign Application Priority Data

Jul. 4, 2007 (KR) .................. 10-2007-0067129

(51) Int. Cl.
*G06F 17/30* (2006.01)
*G06F 12/02* (2006.01)

(52) U.S. Cl.
CPC .... *G06F 12/0246* (2013.01); *G06F 2212/7202* (2013.01); *G06F 2212/7206* (2013.01)

(58) Field of Classification Search
CPC ................................................ G06F 17/30961
USPC .................................................. 707/100, 797
See application file for complete search history.

(56) References Cited

U.S. PATENT DOCUMENTS

| | | | | |
|---|---|---|---|---|
| 5,123,104 A | * | 6/1992 | Levine et al. | 1/1 |
| 5,568,423 A | * | 10/1996 | Jou et al. | 365/185.33 |
| 5,694,608 A | * | 12/1997 | Shostak | 715/236 |
| 5,860,083 A | * | 1/1999 | Sukegawa | 711/103 |
| 5,893,125 A | * | 4/1999 | Shostak | 715/206 |
| 5,906,000 A | * | 5/1999 | Abe et al. | 711/151 |
| 7,383,276 B2 | * | 6/2008 | Lomet | 1/1 |
| 7,761,474 B2 | * | 7/2010 | Lock et al. | 707/797 |
| 7,856,437 B2 | * | 12/2010 | Kirshenbaum | 707/737 |
| 2005/0144360 A1 | | 6/2005 | Bennett et al. | |
| 2005/0171960 A1 | * | 8/2005 | Lomet | 707/100 |
| 2006/0004715 A1 | * | 1/2006 | Lock et al. | 707/3 |
| 2007/0016756 A1 | | 1/2007 | Hsieh et al. | |

(Continued)

FOREIGN PATENT DOCUMENTS

| | | |
|---|---|---|
| JP | 2000-222292 | 8/2000 |
| KR | 1020010064226 A | 7/2001 |

(Continued)

OTHER PUBLICATIONS

Joo et al.; *MFIU: An Efficient Index Buffer Management Scheme for a B+ Tree on NAND Flash Memory*; (English Abstract); Korea Information Science Conference (2007) Korea; Computer General vol. 34, Issue 1 (2007), pp. 92-97.

(Continued)

*Primary Examiner* — Sheree Brown

(74) *Attorney, Agent, or Firm* — Myers Bigel Sibley & Sajovec, P.A.

(57) ABSTRACT

A tree data structure is stored in a flash memory device by storing a leaf node and an index node comprising a pointer to the leaf node in a same page of the flash memory device, which may be read on a per-page basis. A modified version of the leaf node and a modified version of the index node may be stored in a new page of the flash memory device when, for example, a key value is added to or deleted from the leaf node.

5 Claims, 15 Drawing Sheets

(56) References Cited

U.S. PATENT DOCUMENTS

2008/0071809 A1* 3/2008 Lomet ........................... 707/100
2009/0024565 A1* 1/2009 Wong ............................... 707/2

FOREIGN PATENT DOCUMENTS

| KR | 1020040072875 A | 8/2004 |
| KR | 1020060095206 A | 8/2006 |
| KR | 1020060106993 A | 10/2006 |
| TW | M288401 U | 3/2006 |
| TW | I288328 B | 10/2007 |

OTHER PUBLICATIONS

Nam et al.; *Design and Implementation of B-Tree on Flash Memory*; (English Abstract); Information Science Letters; vol. 34, Issue 2 (2007); pp. 109-118.

* cited by examiner

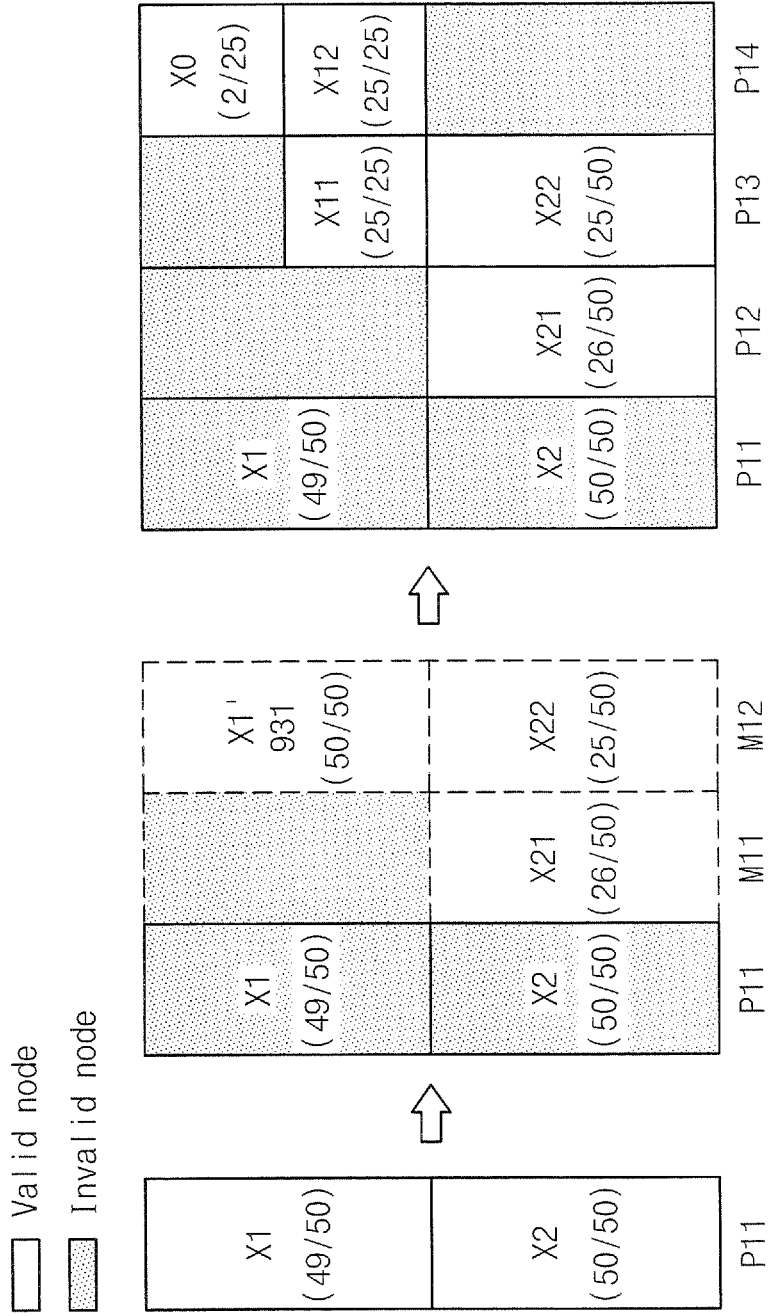

DATA TREE STORAGE METHODS, SYSTEMS AND COMPUTER PROGRAM PRODUCTS USING PAGE STRUCTURE OF FLASH MEMORY

RELATED APPLICATIONS

This application claims priority from Korean Patent Application No. 10-2007-0067129, filed Jul. 4, 2007, the disclosure of which is hereby incorporated herein by reference in its entirety.

BACKGROUND OF THE INVENTION

The present invention relates to a flash memory devices and methods of operation thereof, and more particularly, to data storage methods, systems and computer program products for flash memory devices.

A flash memory device is a nonvolatile memory device that can retain data in a memory chip even without power. Although the flash memory device typically is slower than a dynamic random access memory (DRAM) used, for example, as a main memory of a personal computer (PC), it typically is higher in read speed and more robust against impact than a hard disk. In addition, the flash memory device typically is resistant to damage from environmental impacts, such as high pressure and boiling water. Because of these characteristics, the flash memory device is widely used as a storage unit in devices that are operated with a battery.

A flash memory device is an electrically erasable/programmable nonvolatile memory device. A typical flash memory device may be erased and programmed on a block-by-block basis. Because flash memory devices typically are relatively inexpensive, they are widely used as a high-capacity solid-state nonvolatile storage. Typical examples of the use of the flash memory are in digital music players, digital cameras, and cellular phones. Flash memory devices are also used in universal serial bus (USB) drives, which are widely used to store and transfer data between computers.

Because a hard disk drive mechanically drives a magnetic disk to read/write data, there generally are structural limitations on increasing the operation speed of a hard disk. Because of this, attempts have been made to use flash memory for high-capacity storage to replace hard disk drives. For example, a system booting speed may be increased when a boot code is stored in a flash memory.

SUMMARY OF THE INVENTION

Some embodiments of the present invention provide an indexing scheme for a flash memory.

Embodiments of the present invention provide indexing methods based on a tree structure of a flash memory including a plurality of pages, the indexing methods including: storing a leaf node and an index node related to the leaf node in the same page of the flash memory.

In some embodiments, each of the pages stores an up to k number of leaf nodes and/or index node, k being a positive number.

In other embodiments, the flash memory is read or written on a page basis.

In further embodiments, the number of the leaf nodes or the index nodes stored in the page depends on the height of the tree.

In still further embodiments, the uppermost index node among the index nodes is a root node.

In still further embodiments, the indexing methods further include correcting the leaf node.

In still further embodiments, the correcting of the leaf node includes: changing a pointer of the index node related to the leaf node to be corrected; and storing the leaf node to be corrected and the corrected index node in a new page.

In still further embodiments, the indexing methods further include inserting a new leaf node.

In still further embodiments, the inserting of the new leaf node includes: changing a pointer of the index node related to the new leaf node; and storing the new leaf node and index nodes related to the new leaf node in a new page.

In still further embodiments, the inserting of the new leaf node further includes: determining whether the index node related to the new leaf node is full; if the index node related to the new leaf node is full, dividing the index node into a first index node and a second index node; and generating an upper node of the first and second index nodes.

In still further embodiments, the indexing methods further include inserting a new key value in the leaf node.

In still further embodiments, the inserting of the new key value includes: determining whether the leaf node, in which the new key value is to be inserted, is full; if the leaf node, in which the new key value is to be inserted, is full, dividing the leaf node into a first leaf node and a second leaf node; and inserting the new key value in one of the first and second leaf nodes.

In still further embodiments, the first and second leaf nodes are stored respectively in new pages of the flash memory.

In still further embodiments, the inserting of the new key value further includes: determining whether the index node related to the leaf node, in which the new key value is inserted, is full; if the index node related to the new leaf node is full, dividing the index node into a first index node and a second index node; and generating an upper index node of the first and second index nodes.

In still further embodiments, the first index node is stored in the same page as one of the first and second leaf nodes, and the second index node is stored in a new page together with the upper index node.

In still further embodiments, the indexing methods further include deleting the leaf node.

In still further embodiments, the deleting of the leaf node includes: determining whether the index node related to the deleted leaf node designates another leaf node; and deleting the index node if the index node related to the deleted leaf node does not designate another leaf node.

In still further embodiments, the deleting of the leaf node further includes: decreasing the height of the tree by 1 if a root node of the tree has one child node; and setting the child node of the root node as a new root node.

In still further embodiments, the deleting of the leaf node further includes storing the new root node in a new page.

In still further embodiments, the indexing methods are based on a µ-tree structure.

In other embodiments of the present invention, systems include: a flash memory including a plurality of pages; and a processor accessing the flash memory, wherein the processor performs the above-described indexing methods.

Some embodiments of the present invention provide methods of storing tree data structures in a flash memory device in which a leaf node and an index node comprising a pointer to the leaf node are stored in a same page of the flash memory device. A modified version of the leaf node and a modified version of the index node may be stored in a new page of the flash memory device when, for example, a key value is added to or deleted from the leaf node. The modified version of the index node may include a pointer to the new page. A maximum number of nodes of the tree structure storable in a page of the flash memory device may depend on a height of the tree data structure, and a maximum size of a node of the tree data structure may be dependent on a level of the node in the tree data structure.

In further embodiments, storing a modified version of the leaf node and a modified version of the index node in a new page of the flash memory device may include dividing the leaf node into a first leaf node and a second leaf node if the leaf node is full, inserting a new key value in one of the first and second leaf nodes and storing the first and second leaf nodes in respective new pages of the flash memory. Storing a modified version of the leaf node and a modified version of the index node in a new page of the flash memory device may further include dividing the index node into a first index node and a second index node if the index node is full, generating a higher-level index node pointing to the first and second index nodes, storing the first index node in a first one of the new pages and storing the second index node and the higher-level index node in a second one of the new pages.

In further embodiments, the index node and the leaf node include a first index node and first leaf node of a first branch from a higher-level node shared with a second branch including a second index node and a second leaf node. Storing a leaf node and an index node including a pointer to the leaf node in a same page of the flash memory may include storing the first leaf node and the first index node in a first page. The higher-level node may be stored in the first page, the second leaf node and the second index node may be stored in a second page. It may be detected that removal of a key value from the first leaf node would result in no key values remaining in the first leaf node and that the first index node includes no other pointer to a leaf node. In response, a modified version of the second index node may be stored in a third page. This may eliminate the higher-order node from the tree data structure.

Further embodiments of the invention may provide a system including a processor configured to perform the above-described operations. Still further embodiments may provide computer-readable storage media including computer program code embodied therein configured to execute on a computer, the computer program code including computer program code configured to perform the above-described operations.

In additional embodiments, a system includes a flash memory device including a plurality of pages and a processor operatively associated with the flash memory device and configured to store a leaf node of a tree data structure and an index node including a pointer to the leaf node in a same page of the flash memory. The processor may be configured to operate the flash memory device as a solid state disk (SSD).

BRIEF DESCRIPTION OF THE DRAWINGS

The accompanying figures are included to provide a further understanding of the present invention, and are incorporated in and constitute a part of this specification. The drawings illustrate exemplary embodiments of the present invention and, together with the description, serve to explain principles of the present invention. In the figures:

FIG. 9B is a diagram illustrating an exemplary process for inserting a key value in the leaf node of the μ-tree illustrated in FIG. 9A;

DETAILED DESCRIPTION OF EMBODIMENTS

Figure 1:
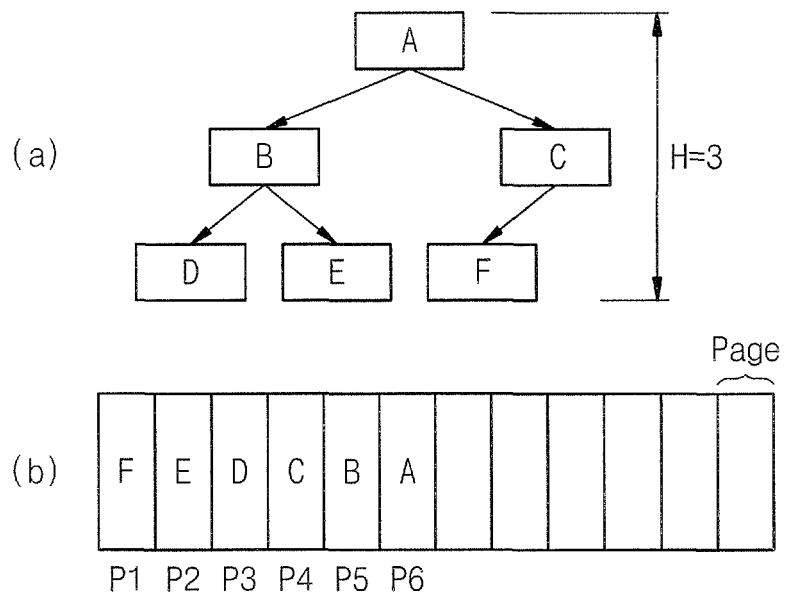
FIG. 1 is a diagram illustrating an example where a typical B+ tree structure is stored in a flash memory.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

In the drawings, the sizes or configurations of elements may be idealized or exaggerated for clarity. It will be understood that when an element is referred to as being "connected to" or "coupled to" another element, it may be directly connected or coupled to the other element or intervening elements may be present. In contrast, when an element is referred to as being "directly connected to" or "directly coupled to" another element, there are no intervening elements present. Like numbers refer to like elements throughout. As used herein, the term "and/or" includes any and all combinations of one or more of the associated listed items.

It will be understood that, although the terms first, second, third etc. may be used herein to describe various elements, components and/or sections, these elements, components and/or sections should not be limited by these terms. These terms are only used to distinguish one element, component, or section from another element, region or section. Thus, a first element, component or section discussed below could be termed a second element, component or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and this specification, and will not be interpreted in an idealized or overly formal sense unless expressly so defined herein.

Throughout the specification, the terms "write" and "program" have the same meaning.

Embodiments of the present invention are described below with reference to schematic diagrams illustrating methods, apparatus (systems and/or devices) and/or computer program products. It is understood that a block of the diagrams, and combinations of blocks in the diagrams, may be implemented by computer program instructions. These computer program instructions may be provided to a processor of a general purpose computer, special purpose computer, and/or other programmable data processing apparatus to produce a machine, such that the instructions, which execute via the processor of the computer and/or other programmable data processing apparatus, create means (functionality) and/or structure for implementing the functions/acts specified in the diagrams. These computer program instructions may also be stored in a computer-readable memory that may direct a computer or other programmable data processing apparatus to function in a particular manner, such that the instructions stored in the computer-readable memory produce an article of manufacture including instructions which implement the function/act as specified in the diagrams. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the diagrams.

Accordingly, the present invention may be embodied in hardware and/or in software (including firmware, resident software, micro-code, etc.). Furthermore, the present invention may take the form of a computer program product on a computer-usable or computer-readable storage medium having program code (instructions) embodied in the computer-readable storage medium for use by or in connection with an instruction execution system. In the context of this document, a computer-usable or computer-readable storage medium may be any medium that may contain, store, communicate or transport the program for use by or in connection with the instruction execution system, apparatus, or device.

The computer-usable or computer-readable storage medium may be, for example, an electronic, magnetic, optical, electromagnetic or semiconductor system, apparatus or device. More specific examples (a non-exhaustive list) of the computer-readable storage medium would include the following: a portable computer diskette, a random access memory (RAM), a read-only memory (ROM), an erasable programmable read-only memory (EPROM or Flash memory), and a portable optical and/or magnetic media, such as a flash disk or CD-ROM.

A µ-tree is a tree structure of a modified B-tree and includes a leaf node and an index node. The leaf node includes sequential data, i.e., key values, which are arranged in ascending order. The index node includes key values and pointers for searching for the key value in the leaf node. Unlike a B-tree, a µ-tree has leaf nodes constituting a linked list in sequential order and thus the key values of the µ-tree may be processed sequentially. This µ-tree is widely used as an index for accessing a database or data stored in a storage medium such as a hard disk. Some embodiments of the present invention provide a new µ-tree structure.

FIG. 1 is a diagram illustrating an example where a typical B+ tree structure is stored in a flash memory. Referring to FIG. 1, a B+ tree (a) has a height (H) of 3, 3 leaf nodes, and 3 index nodes. That is, reference symbols D, E and F denote the leaf nodes, and reference symbols B, C and A denote the index nodes. The uppermost index node A among the index nodes is called a root node. "Root node=Leaf node" if the height of a B+ tree is 1; and "Root node=Index node" if the height of a B+ tree is 2 or more.

The index nodes each include key values and pointers. For example, the index node A includes page addresses P5 and P4 of the index nodes B and C, and the index node B includes page addresses P3 and P2 of the leaf nodes D and E.

The index nodes and the leaf nodes of the B+ tree (a) are stored respectively in pages of a flash memory (b). In general, a flash memory is erased on a block basis and is read/written on a page basis.

Figure 2:
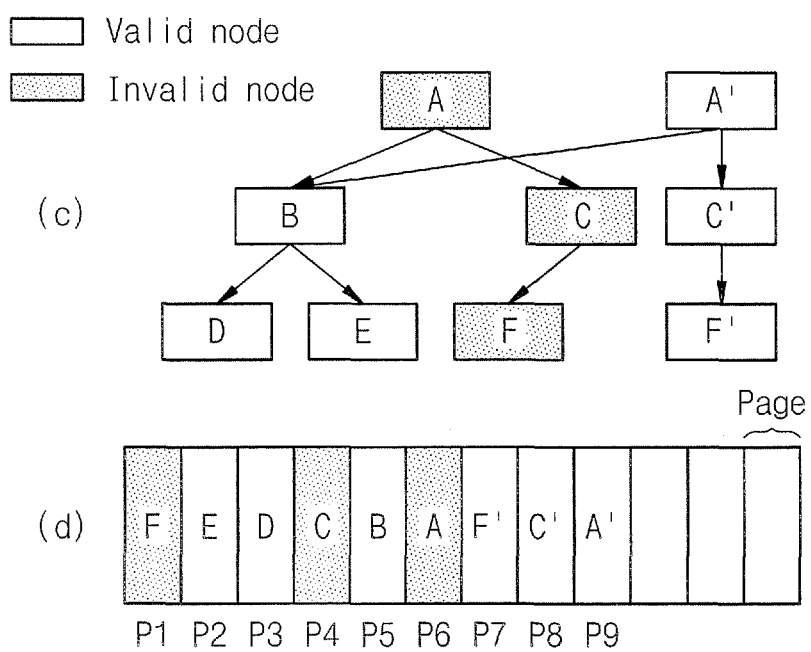
FIG. 2 is a diagram illustrating an example where a correction is made of any leaf node in a B+ tree structure and then a changed B+ tree structure is stored in a flash memory.

FIG. 2 is a diagram illustrating an example where a correction is made of any leaf node in a B+ tree structure and then a changed B+ tree structure is stored in a flash memory. Generally, in a flash memory, an erase operation must be performed in order to write new data in a cell where data have already been written. If new data are to be written without an erase operation, the new data must be written in a new page that has been erased. Thus, in order to insert/delete a key vale in/from a leaf node F of a B+ tree (c), a corrected leaf node F' must be written in a new page P7 of a flash memory (d). An index node C must be corrected to an index node C' to designate the page P7 of the leaf node F', and also an index node A must be corrected to an index node A' to designate a page P8 where the index node C' has been stored. In this way, the correction of the leaf node F leads to the corrections of the index nodes C and A related to the leaf node F. That is, a write is performed by at least the height (H) of the B+ tree in order to correct/insert/delete any leaf node.

Generally, in a NAND flash memory, a write operation requires more time than a read operation, and the number of write operations that may be formed on one block is limited. Therefore, a great deal of time may be required to correct an indexing scheme, and also the lifetime of the NAND flash memory may be shortened.

Figure 3:
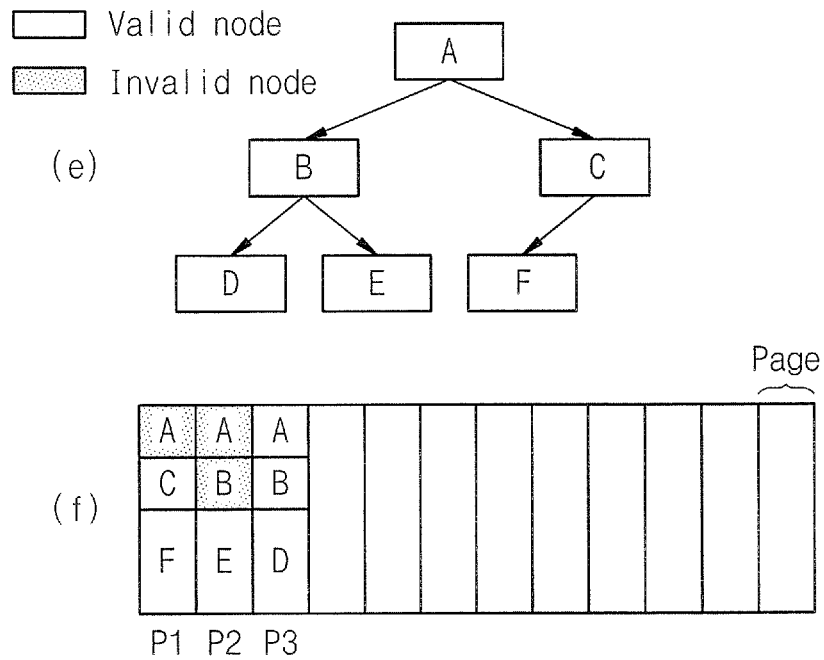
FIG. 3 is a diagram illustrating a scheme for storing a μ-tree in a flash memory according to some embodiments of the present invention.

FIG. 3 is a diagram illustrating a scheme for storing a μ-tree in a flash memory according to some embodiments of the present invention. Referring to FIG. 3, in a μ-tree (e), a leaf node and index nodes related to the leaf node are written in the same page. For example, a leaf node F and index nodes C and A, i.e., parent nodes of the leaf node F are stored in a page P1. Likewise, a leaf node E and index nodes B and A are stored in a page P2, and a leaf node D and the index nodes B and A are stored in a page P3. However, when the leaf node E and the index nodes B and C are stored in the page P2, because the index node A designates the page storing the index nodes B and C, the index node A stored in the page P1 becomes invalid. Likewise, when the leaf node D and the index nodes B and A are stored in the page P3, because a pointer of the index node A designates the pages P1 and P2 storing the index nodes C and B and also a pointer of the index node B designates the pages P3 and P2 storing the leaf nodes D and E, the index node B stored in the page P2 becomes invalid. For example, there is no access to the index node B stored in the page P2. In other words, because a search is made in the order from the index node A (i.e., the root node of the last page P3) to the child nodes, there is no actual access to the index node A stored in the page P1 and to the index nodes A and B stored in the page P2.

Figure 4:
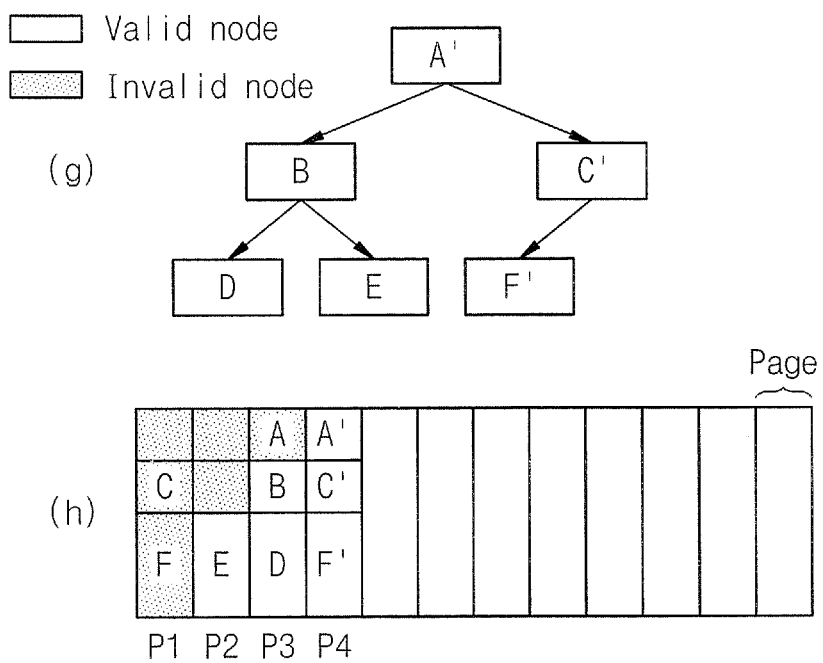
FIG. 4 is a conceptual diagram illustrating a scheme for correcting a leaf node of the μ-tree stored in the flash memory illustrated in FIG. 3, according to some embodiments of the present invention.

FIG. 4 is a conceptual diagram illustrating a scheme for correcting the leaf node of the μ-tree stored in the flash memory illustrated in FIG. 3, according to some embodiments of the present invention. Referring to FIG. 4, not only a leaf node F but also the index nodes C and A are corrected in order to correct the leaf node F. The reason for this is that if a corrected leaf node F' is stored in a new page P4, the index node C designating the leaf node F' is corrected to an index node C' with a corrected pointer to designate the page P4 instead of the page P1. The index node A is corrected to an index node A' with a corrected pointer to designate the index node C'. Herein, the prime denotation (') means that the key value/pointer of the leaf/index node has been corrected.

The corrected nodes F', C' and A' are stored in the page P4. That is, a write operation is performed on only one page P4 in order to correct one leaf node F. Therefore, the time taken to correct the leaf node may be reduced and the use of the flash memory may be reduced. This indexing scheme of the present invention may reduce the number of write operations on the flash memory, thus making it possible extend the lifetime of the flash memory.

When a search is to be made for a leaf node in a flash memory (h) illustrated in FIG. 4, the search is made in the order from the root node A' stored in the last page P4 to the child nodes. That is, the root node A' designates the index nodes B and C', the index node B designates the leaf nodes D and E, and the index node C' designates the leaf node F'. This indexing scheme is suitable for a search scheme of a μ-tree.

Figure 5:
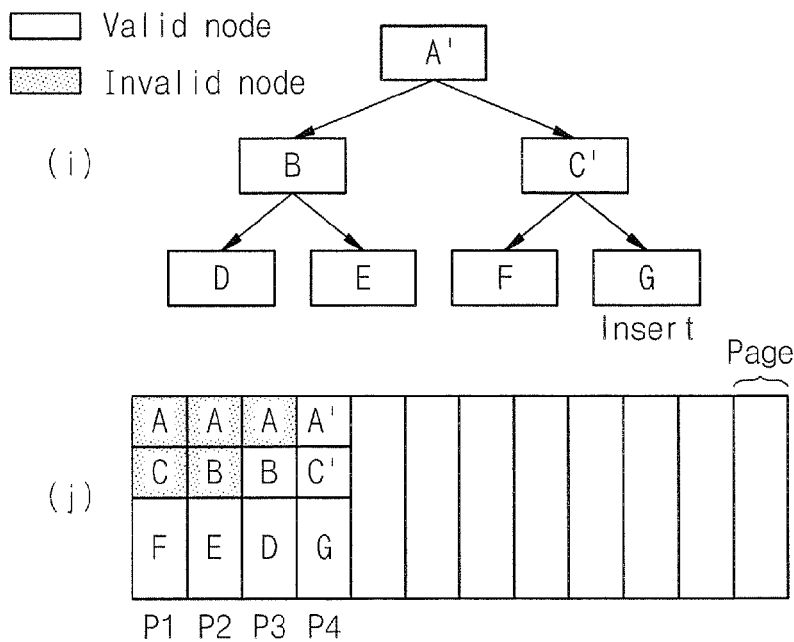
FIG. 5 is a conceptual diagram illustrating a scheme for inserting a new leaf node in the μ-tree stored in the flash memory illustrated in FIG. 3, according to some embodiments of the present invention.

FIG. 5 is a conceptual diagram illustrating a scheme for inserting a new leaf node in the μ-tree stored in the flash memory illustrated in FIG. 3, according to some embodiments of the present invention. When a leaf node G is to be inserted, the index nodes C and A (i.e., the parent nodes related to the leaf node G) must be corrected. Referring to FIG. 5, the corrected index nodes C' and A' and the leaf node G inserted in a μ-tree (i) are stored in a page P4 of a flash memory (j). The corrected index node C' includes a pointer for designating the page P4 storing the leaf node G and the page P1 storing the leaf node F.

It can be seen from the above that the new leaf node may be inserted by a one-time write operation. If the index node C' becomes full after the insertion of the new leaf node G, the index node C' may be split. This will be described in detail below.

Figure 6:
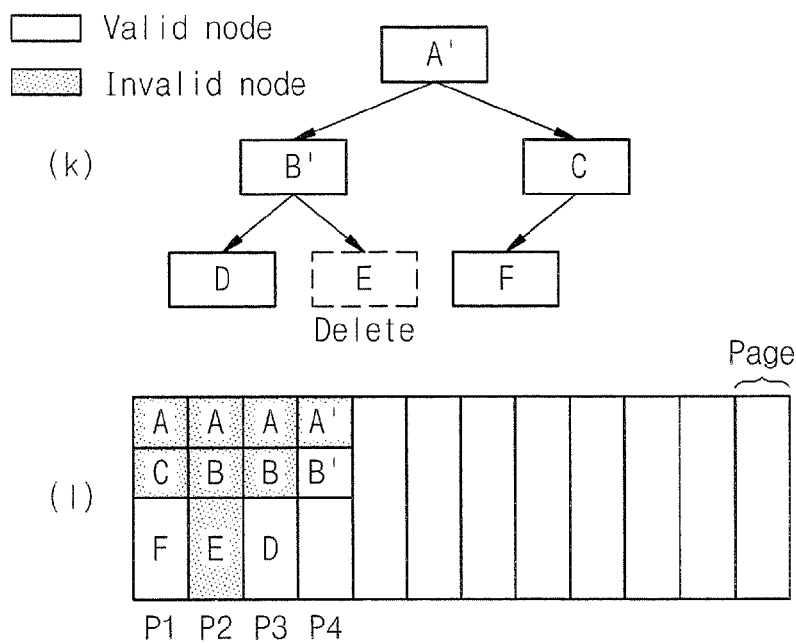
FIG. 6 is a conceptual diagram illustrating a scheme for deleting a leaf node of the μ-tree stored in the flash memory illustrated in FIG. 3, according to some embodiments of the present invention.

FIG. 6 is a conceptual diagram illustrating a scheme for deleting a leaf node of the μ-tree stored in the flash memory illustrated in FIG. 3, according to some embodiments of the present invention. Referring to FIG. 6, when the leaf node E is to be deleted from a μ-tree (k), the index nodes B and A (i.e., the parent nodes related to the leaf nodes E) are corrected. The corrected index nodes B' and A' related to the leaf node E deleted from the μ-tree (k) are stored in the page P4. The corrected index node B' designates the page P3 storing the leaf node D, and the corrected index node A' designates the corrected index node B' and the index node C. The corrected index nodes A' and B' are stored in the page P5 of a flash memory (l).

Figure 7:
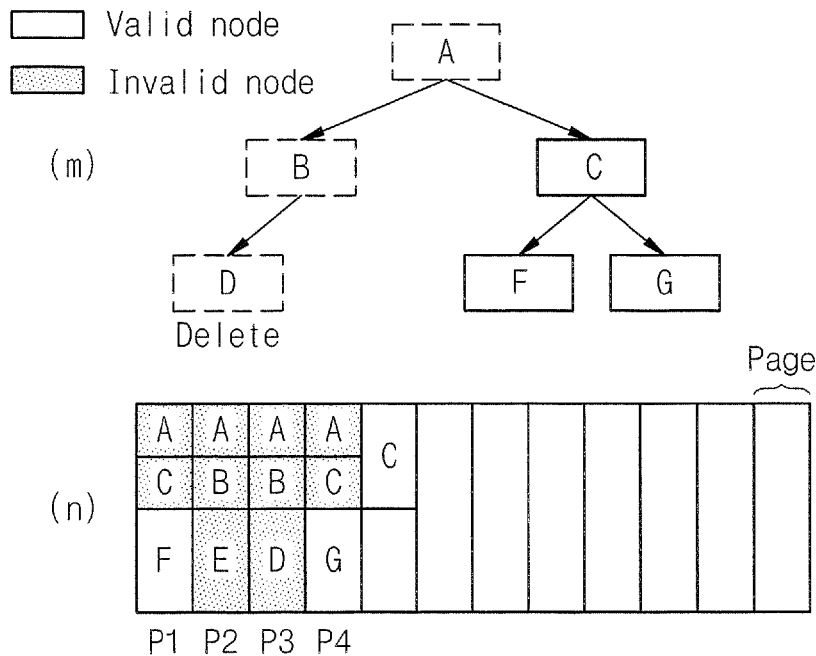
FIG. 7 is a conceptual diagram illustrating a scheme for deleting a leaf node of the μ-tree stored in the flash memory illustrated in FIG. 6, according to some embodiments of the present invention.

FIG. 7 is a conceptual diagram illustrating a scheme for deleting a leaf node of the μ-tree stored in the flash memory illustrated in FIG. 6, according to some embodiments of the present invention. When a leaf node D is to be deleted from a μ-tree (m), the index nodes B and A (i.e., the parent nodes related to the leaf node E) are corrected. Referring to FIG. 6, if the leaf node D is deleted from the μ-tree (m), the index node B does not designate any leaf node. Therefore, the index node B without a child node is deleted. Because the index node A (i.e., the root node) designates only the page P5 storing the index node C, the index node C may be corrected to a root node. For example, the index node C is corrected to a root node pointing to the leaf nodes F and G in pages P1 and P4.

As illustrated in FIGS. 6 and 7, the operation for deleting the leaf node may be achieved by a one-time write operation on the flash memory. The time taken to delete the leaf node may be reduced, and the use of the flash memory may be reduced. An indexing scheme according to some embodiments of the present invention may reduce the number of write operations on the flash memory, which may extend the lifetime of the flash memory.

As described above, the correction, insertion or deletion operations on the leaf node of the μ-tree are sequentially performed in the order from the leaf node to the root node, and the index nodes (i.e., the non-leaf nodes related to the corrected, inserted or deleted leaf node) are stored in one page. Therefore, a page of the flash memory must be designed to be able to store all the nodes from the leaf node to the root node.

Figure 8:
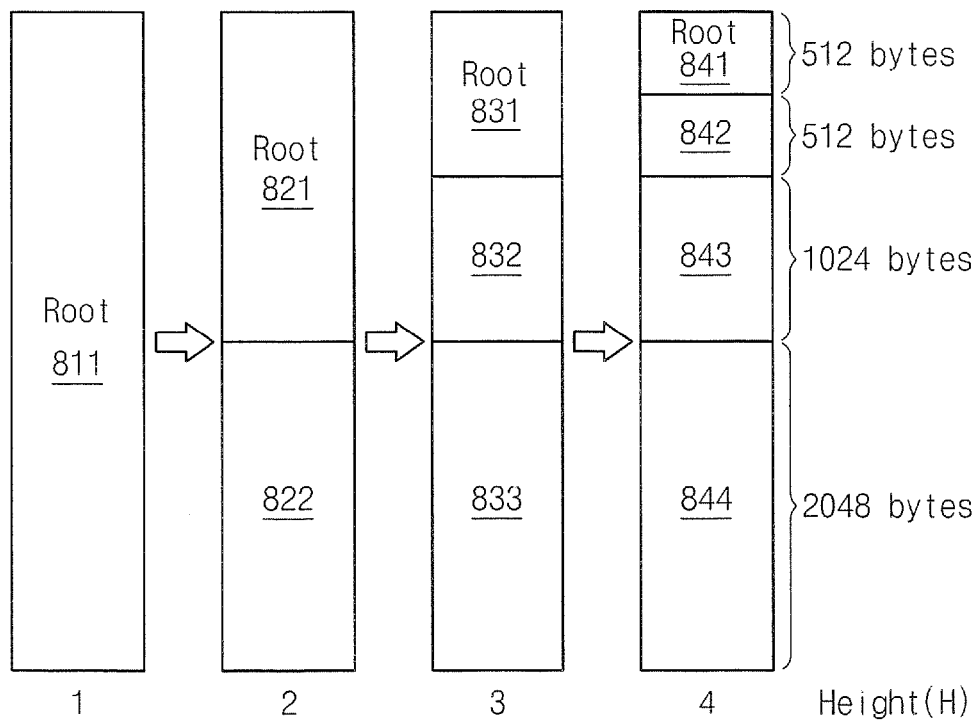
FIG. 8 is a diagram illustrating that the maximum storable size of a leaf/index node stored in one page changes with an increase in height (H)

FIG. 8 is a diagram illustrating that the maximum storable size of a leaf/index node stored in one page changes with an increase in height (H) in some embodiments of the present invention. Referring to FIG. 8, when a page of a flash memory has a size of 4096 bytes, if the height (H) is 1, a root node 811 also has a size of 4096 bytes. If the height (H) is 2, a root node 821 has a size of 2048 bytes and a leaf node 822 also has a size of 2048 bytes. If the height (H) is 3, a root node 831 and an index node 832 each has a size of 1024 bytes and a leaf node 833 has a size of 2048 bytes. If the height (H) is 4; a root node 841 and an index node 842 each has a size of 512 bytes, an index node 843 has a size of 1024 bytes, and a leaf node 844 has a size of 2048 bytes.

With an increase in the height (H), the sizes of the leaf nodes 822, 833 and 844 are maintained at 2048 bytes, while the sizes of the root nodes 811 821 and 831 decrease by ½. It can be seen that when the μ-tree is stored in the flash memory, the maximum height of the μ-tree is determined by the data size of the root node and the size of a page of the flash memory.

The maximum sizes of the index/leaf nodes vary depending on the levels in the tree. For example, if the height (H) is 4; the leaf node 844 of level 4 has a maximum size of 2048 bytes, the index node 843 of level 3 has a maximum size of 1024 bytes, the index node 842 of level 2 has a maximum size of 512 bytes, and the root node 841 of level 1 has a maximum size of 512 bytes.

A flash memory may be built in or connected to various electronic devices such as personal computers, notebook computers, digital music players, digital cameras, and cellular phones. A flash memory built in or connected to the electronic device may be controlled by a processor in the electronic device.

Figure 9A:
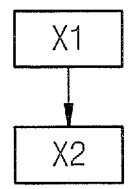
FIG. 9A is a diagram illustrating an example of a μ-tree including a root node and a leaf node.
Figure 9C:
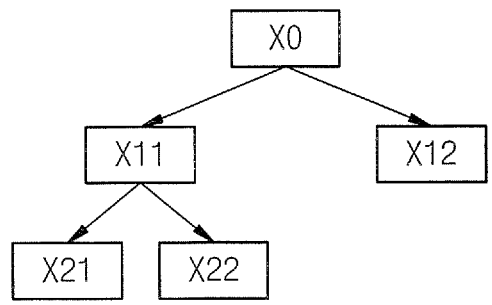
FIG. 9C is a diagram illustrating a changed μ-tree resulting from the key value insertion process illustrated in FIG. 9B.
Figure 10:
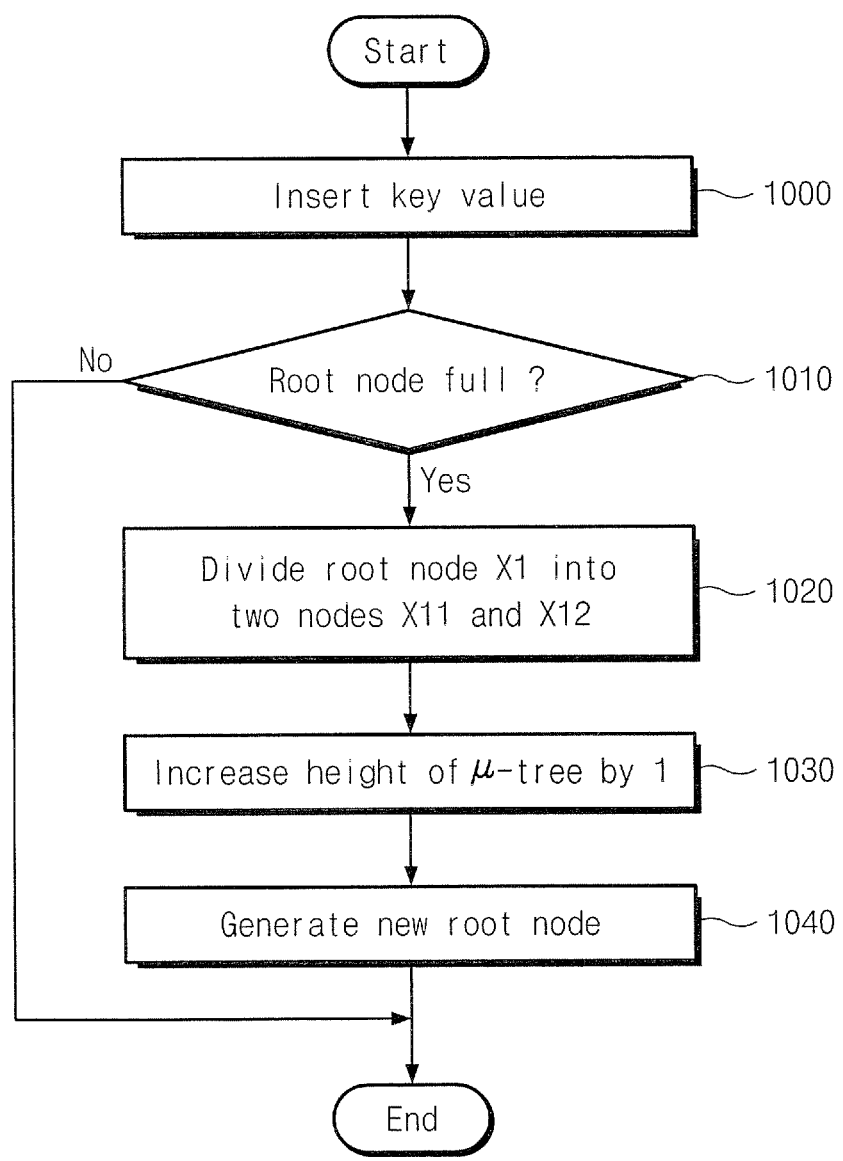
FIG. 10 is a flowchart illustrating a process for inserting a key value in a leaf node of a μ-tree under the control of a processor.

FIG. 9A is a diagram illustrating an example of a μ-tree including a root node and a leaf node. FIG. 9B is a diagram illustrating an exemplary process for inserting a key value in the leaf node of the μ-tree illustrated in FIG. 9A. In the example illustrated in FIG. 9B, the number of key values of a root node or a leaf node, which may be stored in a page of a flash memory, is up to 100. FIG. 9C is a diagram illustrating a changed μ-tree resulting from the key value insertion process illustrated in FIG. 9B. FIG. 10 is a flowchart illustrating a process for inserting a key value in a leaf node of a μ-tree under the control of a processor.

Referring to FIG. 9B and 10, a key value is inserted in a leaf node X2 stored in a page P1 of a flash memory (operation 1000). Because the leaf node X2, in which the key value is to be inserted, is full (the number of stored key values/the maximum number of storable key values=50/50), the leaf node X2 is divided into two leaf nodes X21 and X22 and the two leaf nodes X21 and X22 are temporarily stored in two buffer memories M11 and M12. Herein, a newly inserted leaf node is stored in the leaf node X21 of the buffer memory M11, and a root node X1' designating the new leaf nodes X21 and X22 is stored in the buffer memory M12.

The number of pointers included in a root node X1 stored in the previous page P11 is 49/50. The leaf node X2 is divided into the leaf nodes X21 and X22, and a new pointer is added to designate the leaf node X21. Thus, 50/50 pointers are included in the root node X1'.

Because the root node X1' is full (operation 1010), an index node X1' is divided into two index nodes X11 and X12 (operation 1020). The height (H) of the μ-tree increases by 1 (operation 1030). The index node designating the leaf nodes X21 and X22 is stored in a page P13 of the flash memory, and the index node X12 is stored in a page P14. A new root X0 is generated to designate the index nodes X11 and X12. The root node X0 is stored in the page P14.

In this way, if a leaf node is full when a new key value is inserted in the leaf node, the leaf node is divided by a division operation. If a root node is full by the division of the leaf node, the root node is divided into two index nodes and a new root node is generated (operation 1040). An indexing scheme according to some embodiments of the present invention may perform a minimum write operation even when the leaf node or the root node is full by the insertion of a new key value. Also, an indexing scheme according to some embodiments of the present invention may be designed such that only direct descendent nodes are stored in a page of the flash memory. Thus, an operation such as garbage collection may be relatively easily performed. For example, by performing a validity test on only the lowest level node (leaf node) in a page, the validity of the entire page may be verified.

Figure 11A:
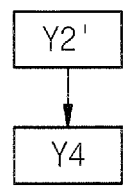
FIG. 11A is a diagram illustrating an example of a μ-tree for describing a key value deletion scheme for a μ-tree.
Figure 11B:
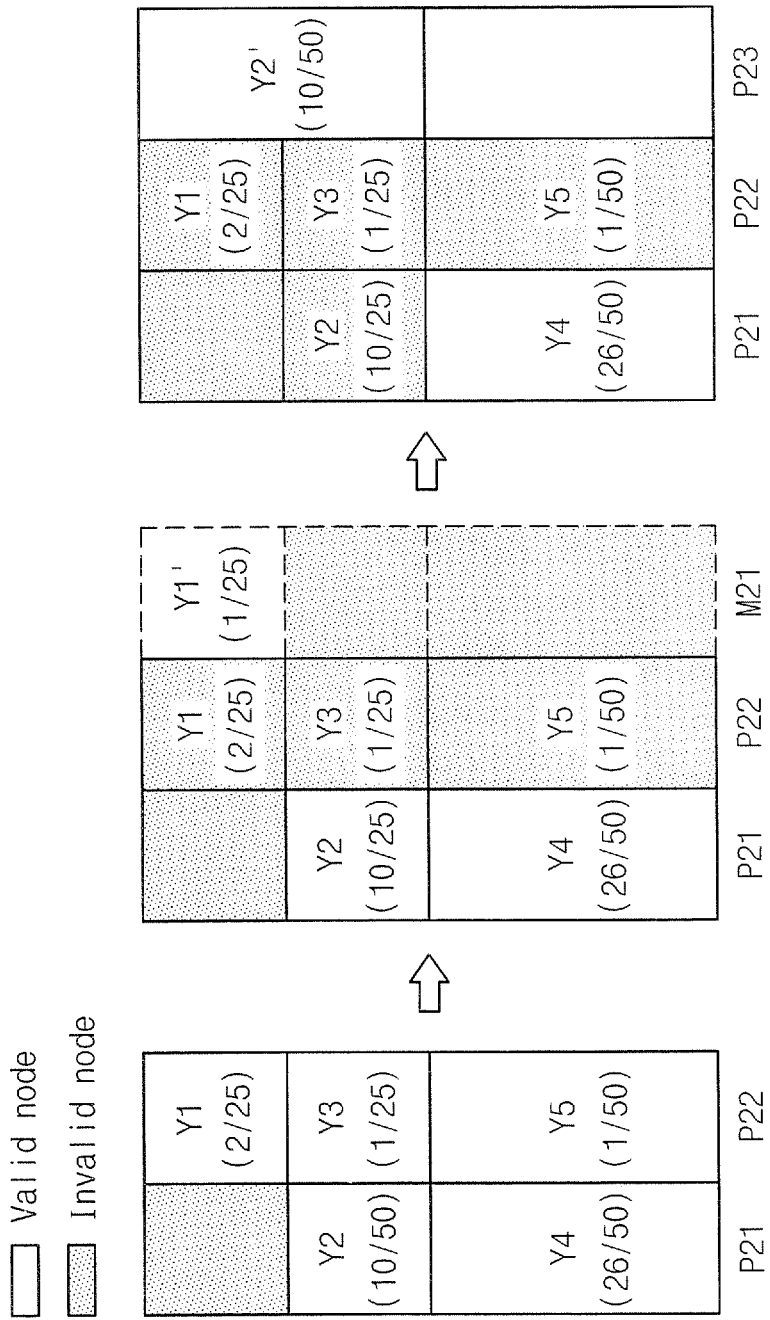
FIG. 11B is a diagram illustrating an exemplary process for deleting a key value from any leaf node of the μ-tree illustrated in FIG. 11A.
Figure 11C:
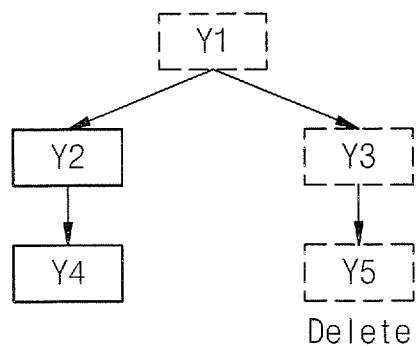
FIG. 11C is a diagram illustrating a changed μ-tree structure resulting from the key value deletion process for the μ-tree illustrated in FIG. 11A.
Figure 12:
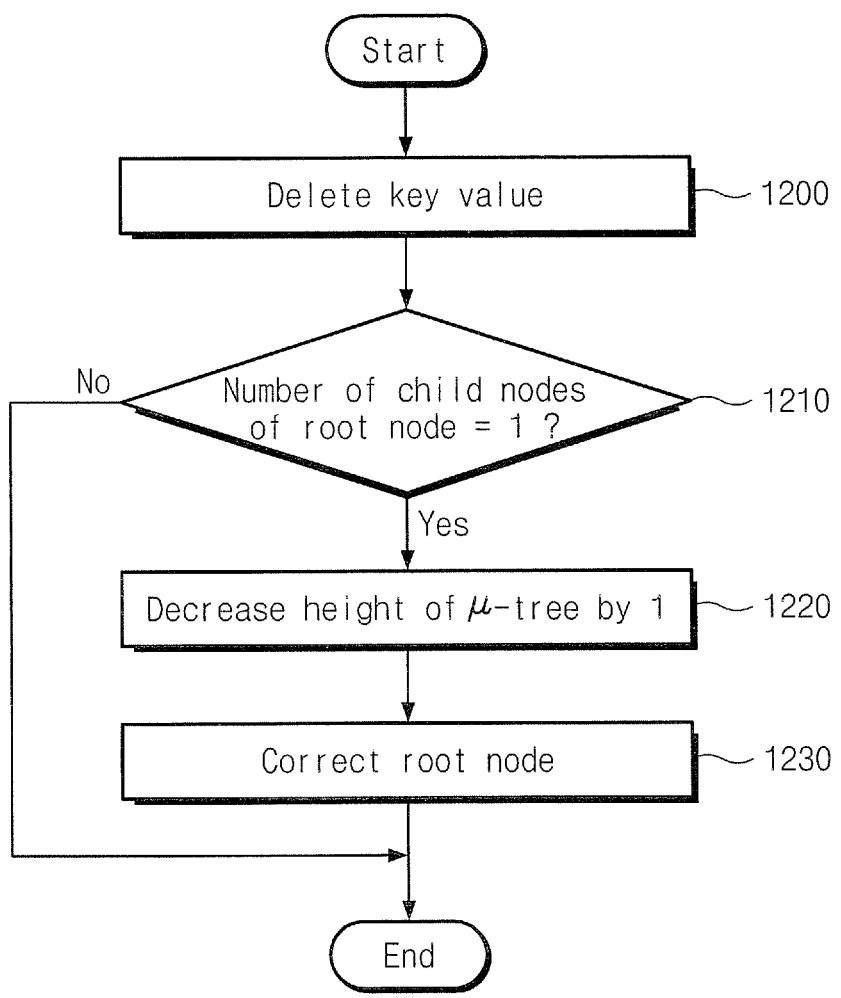
FIG. 12 is a flowchart illustrating a process for deleting a key value from a leaf node of a μ-tree under the control of a processor.

FIG. 11A is a diagram illustrating an example of a μ-tree for describing a key value deletion scheme for a μ-tree. FIG. 11B is a diagram illustrating an exemplary process for deleting a key value from any leaf node of the μ-tree illustrated in FIG. 11A. In the example illustrated in FIG. 11B, the number of key values of a root node or a leaf node, which may be stored in a page of a flash memory, is up to 100. FIG. 11C is a diagram illustrating a changed μ-tree structure resulting from the key value deletion process for the μ-tree illustrated in FIG. 11A. FIG. 12 is a flowchart illustrating a process for deleting a key value from a leaf node of a μ-tree under the control of a processor.

Referring to FIGS. 11B and 12, a leaf node Y5 is deleted (operation 1200). If there is no key value in the leaf node Y5 after a key value is deleted from the leaf node Y5, the leaf node Y5 is deleted. If the leaf node is deleted, there is no child node of an index node Y3 and a root node Y1 has only one child node, i.e., an index node Y2. A root node Y1' corrected to designate only an index node Y2 is stored in a buffer memory M21.

When the root node Y1' has one child node (operation 1210), the height (H) of the μ-tree decreases by 1. In the example illustrated in FIG. 11B, the height (H) of the μ-tree decreases from 3 to 2 (operation 1220). Consequently, the index node Y2 is corrected to a root node Y2' and is stored in a page P23 of a flash memory (operation 1230). Therefore, after the key value of the leaf node Y2 is deleted, the μ-tree illustrated in FIG. 11A is changed to have a leaf node Y4 and a root node Y2' as illustrated in FIG. 11C.

As described above, an indexing scheme according to some embodiments of the present invention may limit the sizes of index/leaf nodes of a μ-tree, thereby making it possible to store a leaf node and parent nodes (e.g., an index node and a root node) related to the leaf node in one page of a flash memory. Therefore, a data write operation on the flash memory may be reduced when the node of the μ-tree is corrected, inserted or deleted. Thus, the lifetime of the flash memory may be extended. When the sizes of the index/leaf nodes of the μ-tree are limited, the height (H) of the μ-tree may increase. However, because the read operation of the flash memory may be faster than the write operation, the speed of the indexing scheme may be increased under various workload conditions.

Figure 13:
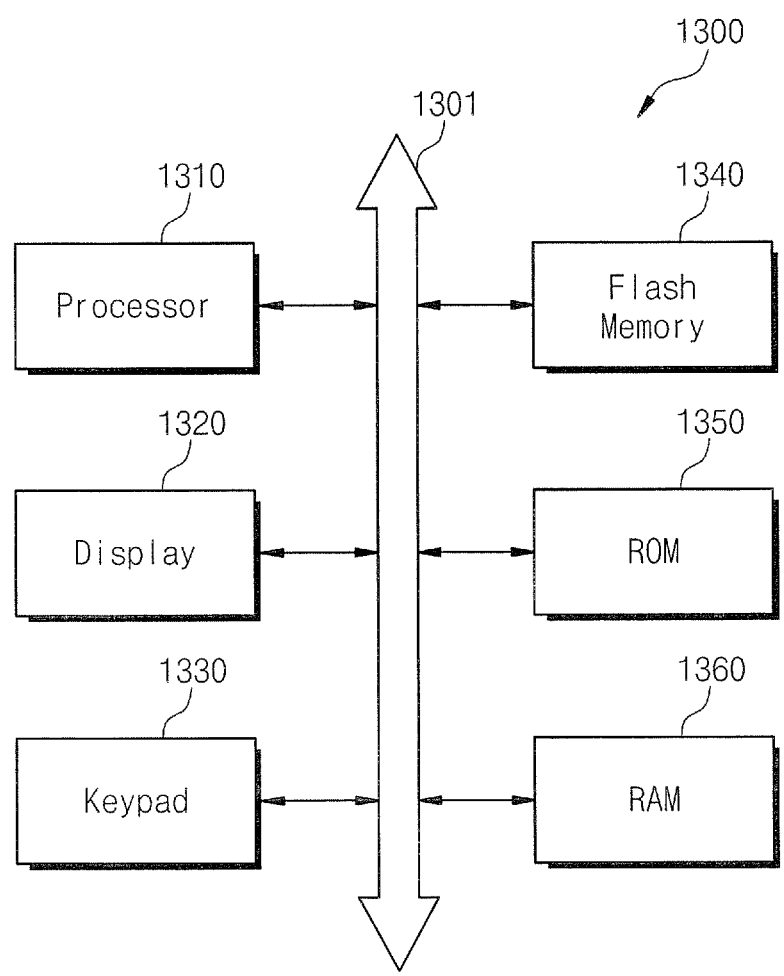
FIG. 13 is a block diagram of an electronic device using an indexing scheme according to some embodiments of the present invention.

FIG. 13 is a block diagram of an electronic device using an indexing scheme according to some embodiments of the present invention. Referring to FIG. 13, an electronic device 1300 includes a processor 1310, a display 1320, a keypad 1330, a flash memory 1340, a read only memory (ROM) 1350, and a random access memory (RAM) 1360 that are connected with a system bus 1301. The electronic device 1300 stores a file system in the flash memory 1340. Herein, the flash memory 1340 uses the indexing scheme of the present invention based on a μ-tree structure. Examples of the electronic device 1300 include digital music players, digital cameras, cellular phones, portable multimedia players (PMPs), and PlayStations. According to an indexing scheme along the lines described above, the processor 1310 may store a leaf node of a μ-tree and index nodes related to the leaf node in one page of the flash memory 1340, and may perform a correction, insertion or deletion operation on the leaf/index node.

Figure 14:
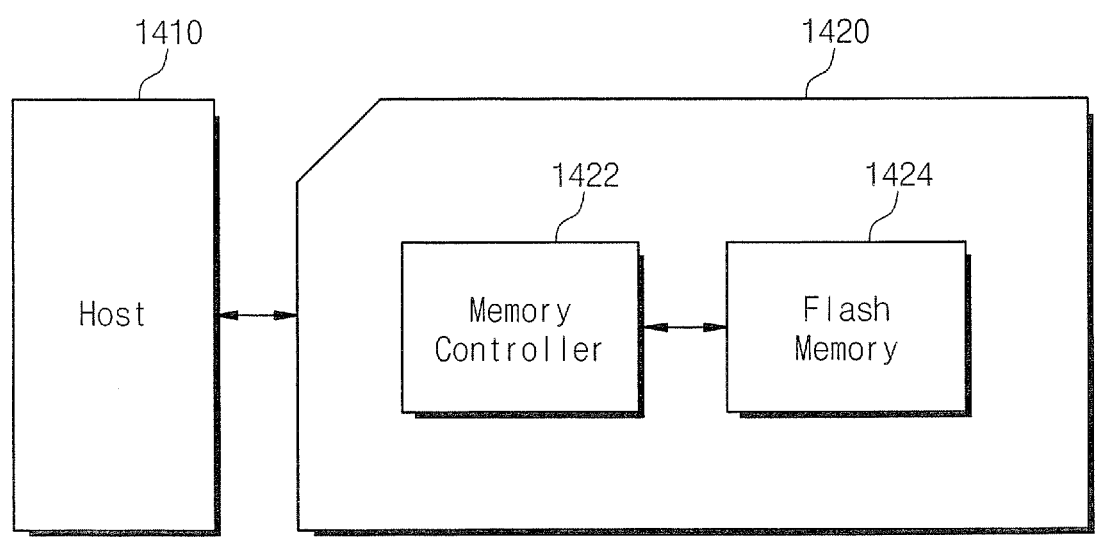
FIG. 14 is a block diagram of a memory system using an indexing scheme according to some embodiments of the present invention.

FIG. 14 is a block diagram of a memory system using an indexing scheme according to some embodiments of the present invention. Referring to FIG. 14, a memory card 1420 is connected to a host 1410. The memory card 1420 includes a memory controller 1422 and a flash memory 1424. The memory controller 1422 provides an interface between the host 1410 and the flash memory 1424. The memory controller 1422 and the flash memory 1424 is constructed in one chip and may be implemented in a compact flash, a smart media, a memory stick, a secure digital (SD) card, a multimedia card, etc. In the above memory system, the host 1410 may access the flash memory 1424 according to an indexing scheme along lines described above.

Figure 15:
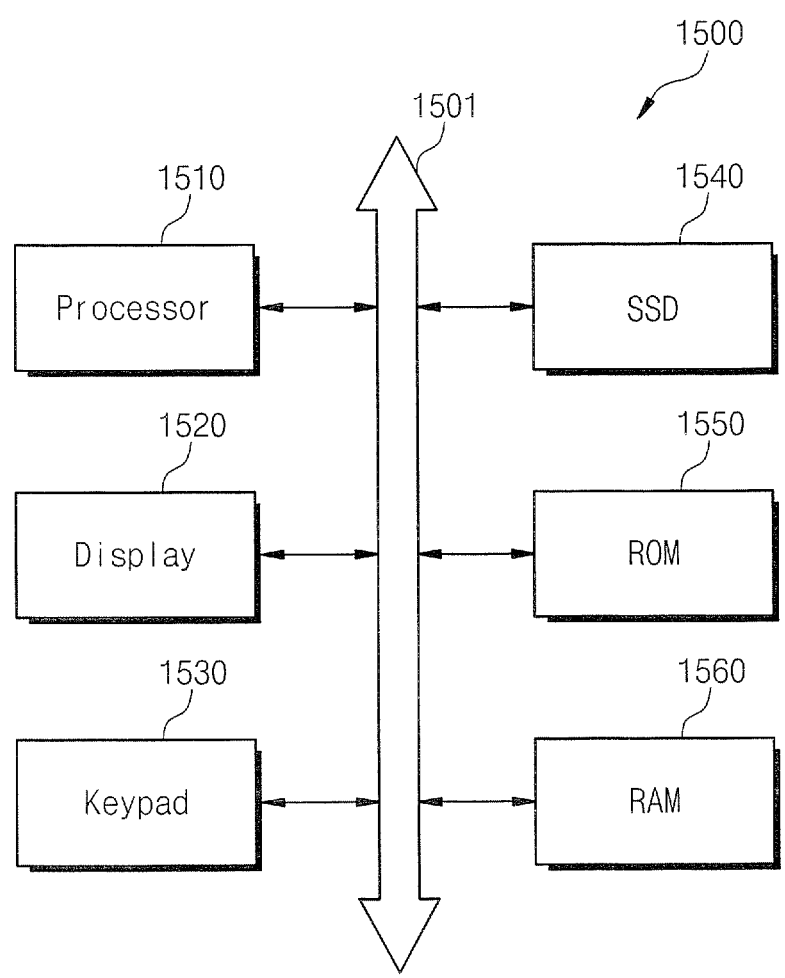
FIG. 15 is a block diagram of another electronic device using an indexing scheme according to some embodiments of the present invention.

FIG. 15 is a block diagram of another electronic device using an indexing scheme according to some embodiments of the present invention.

Referring to FIG. 15, an electronic device 1500 includes a solid state disk (SSD) 1540 instead of the flash memory 1340 of the electronic device 1300 illustrated in FIG. 13. The other structures and operations of the electronic device 1500 are similar to those of the electronic device 1300. Using an indexing scheme along lines described above, a processor 1510 of the electronic device 1500 may store a leaf node of a μ-tree and index nodes related to the leaf node in one page of the SSD 1540, and may perform a correction, insertion or deletion operation on the leaf/index node.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims.

What is claimed is:

1. A method of storing a tree data structure in a flash memory device, the method comprising:
   storing a leaf node and an index node comprising a pointer to the leaf node in a same page of the flash memory device;
   wherein the index node and the leaf node comprise a first index node and first leaf node of a first branch from a higher-level node shared with a second branch comprising a second index node and a second leaf node;
   wherein storing a leaf node and an index node comprising a pointer to the leaf node in a same page of the flash memory comprises storing the first leaf node and the first index node in a first page; and
   wherein the method further comprises: storing the higher-level node in the first page;
   storing the second leaf node and the second index node in a second page;
   storing a modified version of the leaf node and a modified version of the index node in a new page of the flash memory device, wherein the modified version of the leaf node comprises a new key value;
   dividing the leaf node into a first leaf node and a second leaf node if the leaf node is full;
   inserting a new key value in one of the first and second leaf nodes;
   detecting that removal of a key value from the first leaf node would result in no key values remaining in the first leaf node and that the first index node includes no other pointer to a leaf node;
   and responsively storing a modified version of the second index node in a third page.

2. The method of claim 1, wherein storing a modified version of the second index node in a third page eliminates the higher-order node from the tree data structure.

3. The method of claim 1, wherein storing a modified version of the leaf node and a modified version of the index node in a new page of the flash memory device comprises:
   dividing the leaf node into a first leaf node and a second leaf node if the leaf node is full;
   inserting the new key value in one of the first and second leaf nodes; and
   storing the first and second leaf nodes in respective new pages of the flash memory.

4. The method of claim 3, wherein storing a modified version of the leaf node and a modified version of the index node in a new page of the flash memory device further comprises:
   dividing the index node into a first index node and a second index node if the index node is full; generating a higher-level index node pointing to the first and second index nodes; storing the first index node in a first one of the new pages; and storing the second index node and the higher-level index node in a second one of new pages.

5. The method of claim 1, method of storing a tree data structure in a flash memory device, the method comprising:
   wherein the modified version of the leaf node lacks a key value present in the original leaf node.

* * * * *